United States Patent
Chen et al.

(10) Patent No.: US 11,969,787 B2
(45) Date of Patent: Apr. 30, 2024

(54) ADDITIVE MANUFACTURING WITH SEALED PORES

(71) Applicant: Wisconsin Alumni Research Foundation, Madison, WI (US)

(72) Inventors: Lianyi Chen, Madison, WI (US); S. Mohammad H Hojjatzadeh, Madison, WI (US); Qilin Guo, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 17/378,378

(22) Filed: Jul. 16, 2021

(65) Prior Publication Data

US 2023/0028894 A1    Jan. 26, 2023

(51) Int. Cl.
| | |
|---|---|
| B22F 10/28 | (2021.01) |
| B22F 5/10 | (2006.01) |
| B22F 10/366 | (2021.01) |
| B22F 10/38 | (2021.01) |
| B22F 12/43 | (2021.01) |
| B22F 12/49 | (2021.01) |
| B33Y 10/00 | (2015.01) |
| B33Y 30/00 | (2015.01) |

(52) U.S. Cl.
CPC .............. *B22F 10/28* (2021.01); *B22F 5/10* (2013.01); *B22F 10/366* (2021.01); *B22F 10/38* (2021.01); *B22F 12/43* (2021.01); *B22F 12/49* (2021.01); *B33Y 10/00* (2014.12); *B33Y 30/00* (2014.12)

(58) Field of Classification Search
CPC .......... B22F 10/28; B22F 12/49; B22F 12/43; B22F 10/38; B22F 10/366; B22F 5/10; B33Y 10/00; B33Y 30/00
See application file for complete search history.

(56) References Cited

U.S. PATENT DOCUMENTS

2010/0291286 A1\* 11/2010 O'Neill .................... C23C 4/12
427/2.1

OTHER PUBLICATIONS

Hojatzadeh et al. "In-situ characterization of pore formation dynamics in pulsed wave laser powder bed fusion." Materials 14.11 (2021): 2936. (Year: 2021).\*
Cunningham et al. ( "Analyzing the effects of powder and post-processing on porosity and properties of electron beam melted Ti-6Al-4V." Materials Research Letters 5.7 (2017): 516-525.) (Year: 2017).\*
Zhao et al.( "Real-time monitoring of laser powder bed fusion process using high-speed X-ray imaging and diffraction." Scientific reports 7.1 (2017): 1-11.) (Year: 2017).\*

(Continued)

*Primary Examiner* — Sally A Merkling
*Assistant Examiner* — Ricardo D Morales
(74) *Attorney, Agent, or Firm* — Crawford Maunu PLLC

(57) ABSTRACT

Aspects of the disclosure are directed to additively manufacturing a three-dimensional structure. As may be implemented in accordance with one or more embodiments, a plurality of stacked layers are deposited, and for one or more respective layers of the plurality of stacked layers, pores are formed within the layer by applying pulsed energy to the layer. The pulsed energy is used to create a space sealed within the layer and having an inner surface defined by material of the layer.

20 Claims, 3 Drawing Sheets

(56) References Cited

OTHER PUBLICATIONS

Zeng, G. H., et al. "3D printed breathable mould steel: Small micrometer-sized, interconnected pores by creatively introducing foaming agent to additive manufacturing." Materials & Design 169 (2019): 107693. (Year: 2019).*
Seo et al. ( "Effect of track spacing on porosity of metallic foam fabricated by laser melting deposition of Ti6Al4V/TiH2 powder mixture." Vacuum 154 (2018): 200-207.) (Year: 2018).*
S. Mohammad H. Hojjatzadeh, et al., "In-Situ Characterization of Pore Formation Dynamics in Pulsed Wave Laser Powder Bed Fusion", Materials 2021, 14, 2936, https://doi.org/10.3390/ma14112936, https://www.mdpi.com/journal/materials, Published May 29, 2021.

* cited by examiner

ADDITIVE MANUFACTURING WITH SEALED PORES

STATEMENT REGARDING FEDERALLY SPONSORED REASEARCH AND DEVELOPMENT

This invention was made with government support under 2002840 awarded by the National Science Foundation. The government has certain rights in the invention.

BACKGROUND

A variety of metal and other materials are manufactured to include foam-like voids. For instance, metal foam is a cellular structure having solid metal with pores, which may maintain a vacuum or be filled with gas, with the pores making up a large portion of the structure's volume. Such materials may have low densities and attractive physical, mechanical, thermal, electrical, and acoustic properties. Fabrication techniques for metal foams include casting or powder metallurgy, in which pores with varying sizes and random dispersion are formed inside the bulk of the metals.

While cellular structures such as metal foams have been useful, manufacturing techniques utilize chemical foaming agents that introduce impurities and unwanted elements to the composition of the metal foam. These and other matters have presented challenges to the formation of porous structures, for a variety of applications.

SUMMARY

Various example embodiments are directed to additive manufacturing approaches utilizing pore creation at specified locations, resulting structures, and related apparatuses for manufacturing the structures. Such embodiments may be useful for forming patterned pores within a substrate to provide one or more of a variety of characteristics, for instance similar to metal foams yet mitigating issues as noted above. Further, such approaches may be carried out while mitigating the introduction of impurities, for instance by forming sealed pores without necessarily utilizing chemical foaming agents.

As may be implemented in accordance with one or more embodiments, a method for additively manufacturing a three-dimensional structure is carried out as follows. A plurality of stacked layers are deposited, and for at least one of the plurality of stacked layers, pores are formed within the layer by applying pulsed energy to the layer. Respective pulses of the pulsed energy are used to create and seal a space sealed within the three-dimensional structure, and having an inner surface defined by material of the three-dimensional structure.

Certain embodiments are directed to an apparatus having a plurality of stacked layers and a plurality of pores in at least one of the stacked layers. Each pore has an inner surface defined and sealed by material of the layer and is spaced from adjacent ones of the pores by a defined gradient.

Other embodiments are directed to an apparatus for additively manufacturing a three-dimensional structure. The apparatus is programmed and configured to deposit a plurality of stacked layers, and for respective layers of the plurality of stacked layers, form pores by applying pulsed energy to the layer, for each pore. The pulsed energy is used to create a space sealed within the layer and having an inner surface defined by material of the layer.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description and in connection with the accompanying drawings, in which.

Figure 1:
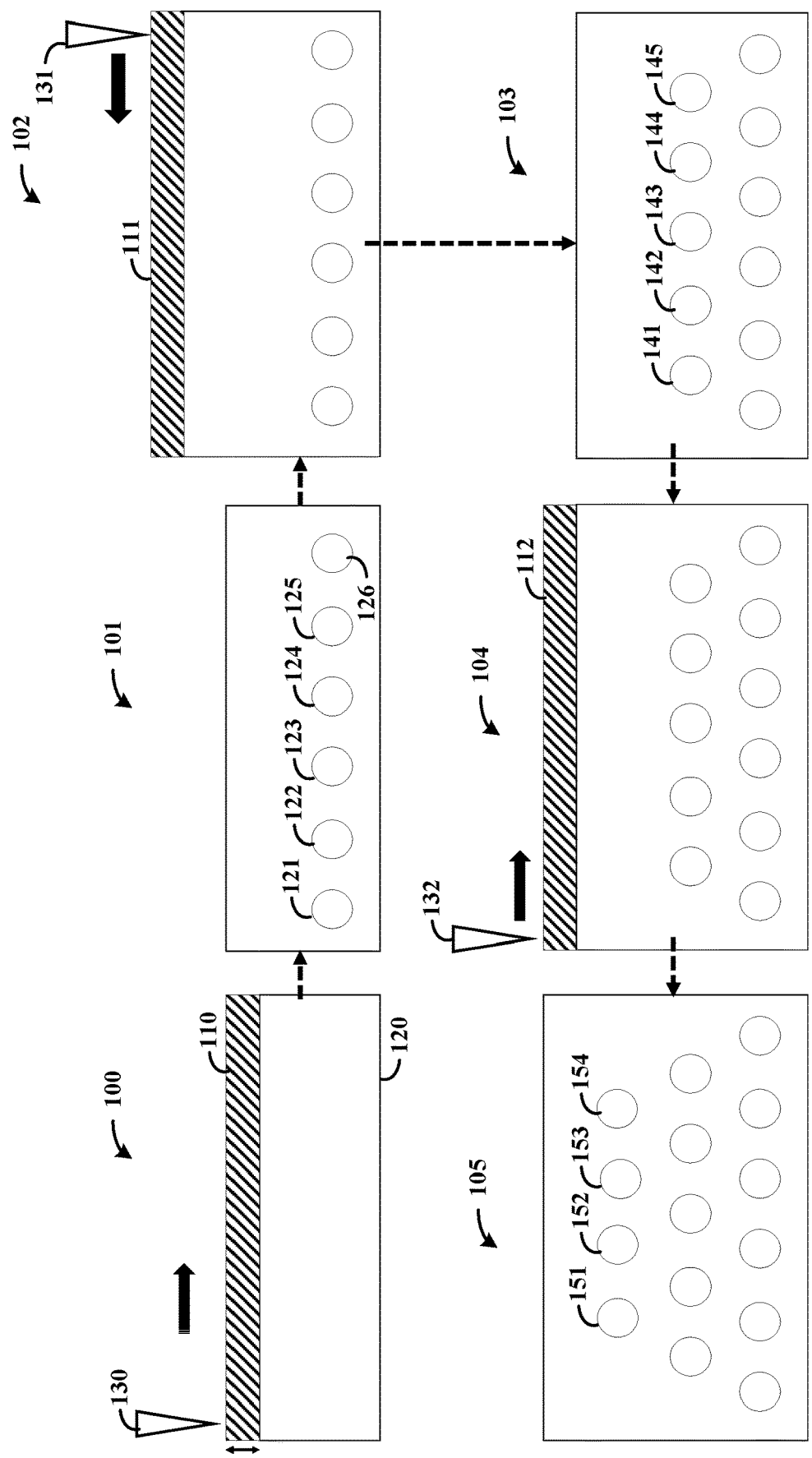
FIG. 1 shows an approach for forming patterned pores, in connection with one or more embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as may be used throughout this application is by way of illustration, and not limitation.

DETAILED DESCRIPTION

Aspects of the present disclosure are believed to be applicable to a variety of different types of methods, articles of manufacture, apparatuses and systems involving structures with pores. In certain implementations, aspects of the present disclosure have been shown to be beneficial when used in the context of additively manufacturing materials such as metal, by forming pores at select locations utilizing pulsed energy. Particular embodiments are directed to forming patterned pores by forming an open pore with a first energy pulse, and then melting material near an upper portion of the pocket to seal the pore. While not necessarily so limited, various aspects may be appreciated through a discussion of examples using such exemplary contexts.

Various embodiments are directed to addressing challenges including those noted in the background section above. For instance, a 3D printing approach may involve fabricating metal foams with defined pore patterns in a controllable manner, using an energy source to create and seal pores with successive pulses and in predefined locations. Such an approach may involve printing metal foams with uniform pore dispersion (and thereby tunable density), as well as custom pore patterns for lightweight structures reinforced at certain points. In connection with such approaches, it has been recognized/discovered that utilizing pulses as characterized herein, such as to create a cavity and then seal the cavity with an ensuing pulse, desirable pore densities and patterns can be readily formed without utilizing foaming agents (and thus mitigating the introduction of impurities). Such approaches may be used to form lightweight structures, provide for energy absorption and thermal management, and manufacture filters, catalysts, surgical implants, and fuel cells.

A variety of energy sources may be used for applying pulses to create pores as characterized herein. In some implementations, a pulsed mode laser powder bed fusion additive manufacturing (Pulsed-LPBF AM) approach is used to fabricate metal foams containing patterns of micron sized closed pores. Metal may be printed directly from digital models in a layer-wise manner. Pores may be formed by generating a cavity with an energy pulse and then sealing that cavity with another energy pulse. This can be controlled, for example, by adjusting laser process parameters such that different patterns of pores and/or different pore sizes can be produced inside the bulk of the metal. Pore formation may be carried out in each layer after it is deposited and before depositing another layer, or in a particular layer after one or more layers have been formed on that particular layer. Similar approaches may be carried out using other types of energy pulses, such as electron beam pulses. For general information regarding energy pulses, and for specific information concerning types of energy pulses and their application as may be modified and otherwise utilized in connection with one or more embodiments herein (e.g., to create, rather than mitigate, pores), reference may be made to Hojjatzadeh, S. M. H.; Guo, Q.; Parab, N. D.; Qu, M; Escano, L. I.; Fezzaa, K; Everhart, W; Sun, T; Chen, L., "In-Situ Characterization of Pore Formation Dynamics in Pulsed Wave Laser Powder Bed Fusion," Materials 2021, 14, 2936, which is fully incorporated herein by reference.

Aspects of the present disclosure are directed to additively manufacturing a three-dimensional structure, in which a plurality of stacked layers are deposited. Pores are formed within one or more respective layers of the stacked layers by applying and using pulsed energy (e.g., laser and/or electron beam energy) to create and seal a space within the three-dimensional structure and having an inner surface defined by material of the layer. This approach may involve simultaneously forming a new layer on a substrate while also forming a pore within the substrate, using the pulsed energy. The pores may be targeted to a particular depth into the substrate, and forming pores within each layer may involve forming an entire pore within a single layer or forming a pore that spans two or more layers. The size, shape and location of the pores may be precisely programmed and controlled to achieve a desired pattern. Further, pores may be created as such in one or more of a variety of materials, such as within metals, ceramics or polymers. In addition, sealing the pores in this regard may mitigate or prevent contamination from entering or otherwise being formed in the pores.

Pores as discussed above may be formed in a variety of manners to suit particular applications, material types, and manufacturing needs. For instance, a first pulse may be applied to create a cavity and a second, subsequent pulse may be applied to create a melt pool that covers an upper portion of the cavity and forms/seals a pore. In some embodiments, the pores are formed within a layer by applying an energy pulse to an upper surface of a layer and using the energy pulse to form an open cavity in the layer and extending from the upper surface to a depth within the layer. The energy pulse is terminated, causing an upper portion of the cavity to collapse, therein forming a sealed space at the depth within the layer.

These approaches may involve, for example, applying an energy pulse to an upper surface of a layer, over which additional material is being deposited and used to form another stacked layer, such as via powder bed manufacturing as noted herein. This approach may further involve applying an energy pulse to an upper surface of a layer, over which one or more layers are stacked, with the energy pulse being applied to (and through) the one or more such layers. Accordingly, an "upper surface" of a layer in this regard may refer to an uncovered surface, a surface over which one or more additional layers of material have been formed (e.g., a metal layer that has been solidified), or a surface on which additional material such as a powder bed of material has been placed and which is being melted and solidified to form a layer (e.g., before, during and/or after pore formation). For powder bed applications, the powder bed may be melted via the same applied pulsed energy used to simultaneously form a pore in the underlying layer, or may be melted with a separate pulsed energy pass.

In some embodiments, energy pulses are applied by scanning a laser across an upper surface of the layer. A first open cavity may be formed in the layer by applying a first laser pulse to a first portion of the upper surface, with the first open cavity extending from the upper surface to a depth within the layer. An upper portion of the first open cavity is collapsed to form a sealed space at the depth within the layer, by terminating the first laser pulse and forming (e.g., as the laser is scanned further past the first portion of the upper surface) a second open cavity in the layer by applying a second laser pulse to a second portion of the upper surface, the second open cavity extending from the upper surface to a depth within the layer, and collapsing an upper portion of the second open cavity and therein forming another sealed space at the depth within the layer, by terminating the first laser pulse.

Pore characteristics may be controlled using one or more of a variety of approaches. For instance, beam size, beam energy, pulse duration (and related amount of energy), time between pulses, and scanning speed may all be utilized separately and/or in connection with one another for controlling the size of each pore based on the size of the beam. Temporal and spatial profiles of the pulsed energy may be used to control pore shape. In addition, the location of each pore, including depth, may be set by controlling the application of energy pulses. For instance, pores may be formed at a defined density by applying the pulsed energy to respective locations of the layer corresponding to the defined density. Pores may be formed in in a pattern that tunes the properties of the material in which the pores are formed, or that reinforces a particular portion with added structural strength.

In some implementations, successive pulses are utilized in the formation of adjacent pores. For instance, applying pulsed energy as noted herein may include applying a first pulse to create a first cavity for a first pore, and applying a second pulse that operates to both create a melt pool that covers an upper portion of the first cavity to form the first pore while also forming a second cavity for a second pore.

Certain embodiments are directed to an apparatus having a plurality of stacked layers and a plurality of pores in at least one of the stacked layers. Each pore has an inner surface defined and sealed by material of the layer and is spaced from adjacent ones of the pores by a defined gradient. Such an apparatus may be formed in accordance with one or more approaches characterized herein, and exhibit features resulting from such formation. In some embodiments, each pore of the apparatus has an upper portion of the inner surface characterized by a re-melted portion of the material of the layer that seals a previously melted and solidified portion of the inner surface.

Turning now to the figures, FIG. 1 shows an apparatus at various stages of manufacture using an approach for forming patterned pores, in connection with a particular embodiment. Referring to stage 100, a layer of metal powder 110 is deposited on the top of a substrate material 120, which may include one or more previously-formed layers. An energy beam 130 is scanned in the direction as shown by an arrow and used to simultaneously melt the layer of metal powder 110 and form pores 121-126. The result is shown at stage 101.

At stage 102, another layer of metal powder 111 has been deposited, and in scanning with energy beam 131 in the direction shown by the arrow, the layer of metal powder 111 is melted while simultaneously forming additional pores 141-145 as shown at stage 103. These additional pores 141-145 may, for example, be formed within the layer created by melting powder metal layer 110 and/or in other regions of the apparatus.

At stage 104, yet another layer of metal powder 112 is deposited and energy beam 132 is scanned in the direction of the arrow as shown, melting the layer of metal powder and forming additional pores 151-154 as shown in stage 105. Again, pores 151-154 may be formed in the layer formed form metal powder 111 and/or in other regions of the apparatus.

The approach shown in FIG. 1 may be carried out using a variety of approaches, types of pulsed energy, and materials. For instance, laser parameters similar to those noted in the Hojjatzadeh reference cited above, may be utilized. Table 1 below shows example laser processing parameters for a synchronous technique, and may be implemented in connection with FIG. 1 and the discussion above.

TABLE 1

| | Laser power (W) | Laser scan speed (m/s) | Laser frequency (kHz) | Laser duty cycle (%) | Powder layer thickness (μm) | Laser beam size (μm) | Point distance (μm) |
|---|---|---|---|---|---|---|---|
| Powder layer deposition and pore formation | 500 | 0.5 | 4 | 60 | 50-70 | 80 | 50 |

Figure 2:
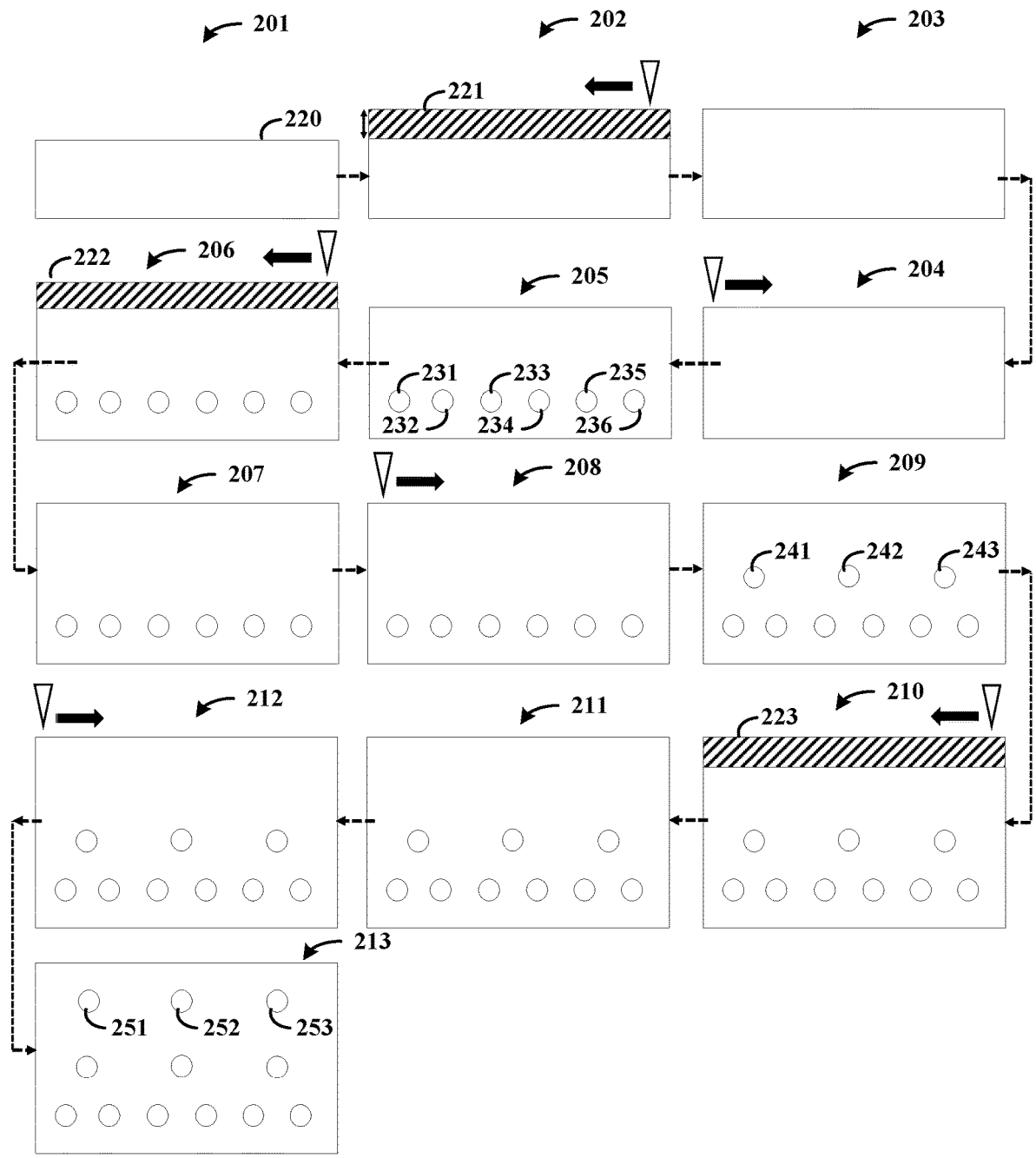
FIG. 2 shows an approach for forming patterned pores along with an additional deposited layer, in connection with a particular embodiment.

FIG. 2 shows an approach in stages 201-213 for forming patterned pores along with an additional deposited layer, in connection with a particular embodiment. In this technique, a layer of powder is deposited on the top of a substrate, and a layer of patterned pores is subsequently formed inside the substrate. Variations in pore's locations along the vertical and horizontal axes can be enabled by tuning the point distance, layer thickness, penetration depth and the heat source scan speed. Referring to stages 201-203 as an example, powder 221 may be deposited over substrate 220 and subjected to a laser scan to melt the powder 221 and form an additional layer of the substrate. As shown at stages 204-205, the laser may again be scanned to form pores 231-236. An additional layer of powder 222 is then deposited and scanned as shown in stages 206-207 to add an upper layer to the substrate. As shown in stages 208-209, a further scan may be used to create pores 241-243.

One or more additional layers of substrate and of pores may continue to be formed. For instance, as shown in stages 210-213, an additional layer of powder 223 may be deposited and scanned to add to the substrate, and a further scanning step may be performed (at 212) to form additional pores 251-253.

In some embodiments, a mix of layer and pore formation may be used. For instance, certain pores may be formed simultaneously with the formation of an additional layer as depicted in FIG. 1, in connection with a separate formation of a further layer such as shown in stages 201 and 202 of FIG. 2. Further aspects of FIG. 2, for example including pore formation that is carried out separately from the formation of a layer at stages 204-205, may also be combined with simultaneous formation as in FIG. 1 and/or the aforementioned combination of simultaneous formation with separate formation of a layer as in stages 201-202.

A variety of approaches may be used to carry out the steps shown in FIG. 1. Table 2 shows example laser processing parameters as may be used with this technique.

TABLE 2

| | Laser power (W) | Laser scan speed (m/s) | Laser frequency (kHz) | Laser duty cycle (%) | Powder layer thickness (μm) | Laser beam size (μm) | Point distance (μm) |
|---|---|---|---|---|---|---|---|
| Powder layer deposition | 220 | 0.6 | — | — | 50 | 80 | — |
| Pore pattern formation | 450-530 | 0.5-0.7 | 4 | 60 | — | 80 | 50-70 |

Figure 3:
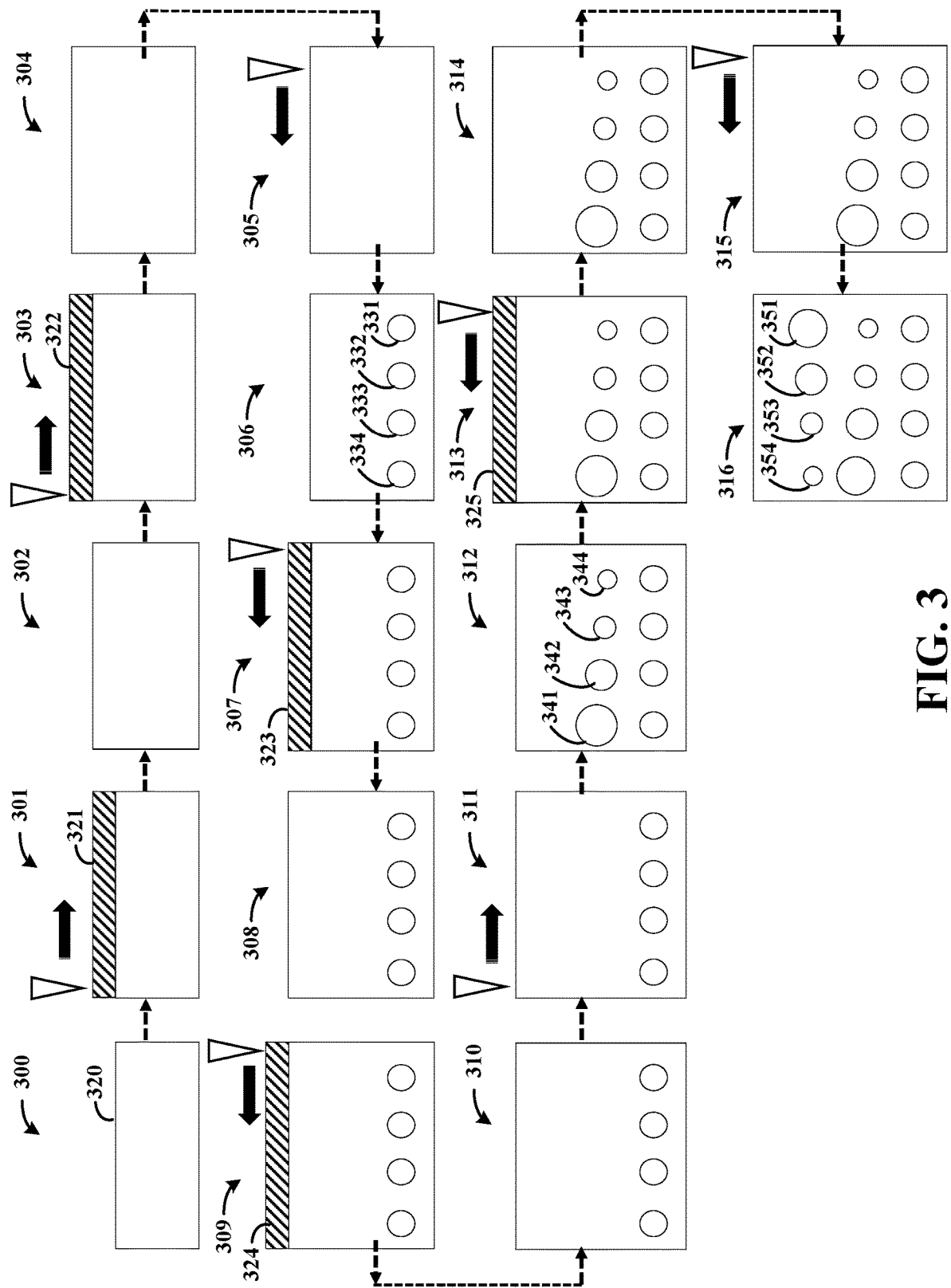
FIG. 3 shows an approach for forming patterned pores utilizing multiple additionally-deposited layers, in connection with a particular embodiment.

FIG. 3 shows another approach to manufacturing a structure with pattern pores, here utilizing a two-extra-layer technique, as may be implemented in accordance with one or more embodiments. In this technique, two layers of powder are successively deposited on the top of the metal. Subsequently, a layer of patterned pores is formed inside the metal substrate by laser melting. For instance, referring to stages 300-304, two additional layers are added to a substrate 320, by depositing and melting powder layers 321 and 322 with a scanned laser as shown in stages 301 and 303. Pores 331-334 are formed as shown in stages 305 and 306, followed by adding two layers in stages 307-310 via the deposition and scanning of two additional layers 323 and 324.

Pores with varying sizes within one layer of metal foam can be obtained by tuning parameters of the scanned laser beam during the pore formation steps. Specifically, a second layer of pores 341-344 is formed at stages 311 and 312 and to different sizes as shown, by varying parameters of the scanned laser, such as by changing beam size, laser frequency and/or laser duty cycle. An additional layer is formed by depositing and laser-scanning powder 325 at stages 313-314, and yet another layer of variable-size pores 351-354 is formed at stages 315-316.

A variety of approaches may be used to achieve structures as shown and/or similar to that shown in FIG. 3. Table 3 below shows example laser parameters that may be used in such as in two-extra-layer technique.

TABLE 3

| | Laser power (W) | Laser scan speed (m/s) | Laser frequency (kHz) | Laser duty cycle (%) | Powder layer thickness (μm) | Laser beam size (μm) | Point distance (μm) |
|---|---|---|---|---|---|---|---|
| Powder layer deposition | 260 | 0.6 | — | — | 50 | 80 | — |
| Pore pattern formation | 500-700 | 0.5 | 4 | 60 | — | 80-100 | 50 |

Based upon the above discussion and illustrations, those skilled in the art will readily recognize that various modifications and changes may be made to the various embodiments without strictly following the exemplary embodiments and applications illustrated and described herein. For example, a variety of different types of energy pulses may be used, such as to replace and/or augment the use of laser pulses and/or electron beam pulses as characterized herein. Further, different energy sources may be used to create different pulses. In addition, a variety of patterns, pore densities, and pore depths may be used to suit particular applications. Various iterations of simultaneous and non-simultaneous layer and pore formation may be utilized. Such modifications do not depart from the true spirit and scope of various aspects of the invention, including aspects set forth in the claims.

What is claimed is:

1. A method for additively manufacturing a three-dimensional structure, the method comprising:
    depositing a plurality of stacked layers devoid of metal foaming agents; and
    for at least one layer of the plurality of stacked layers, forming sealed pores within the layer by applying pulsed energy to the layer, and using respective pulses of the pulsed energy to create a fully sealed space within the three-dimensional structure and having an inner surface defined by material of the three-dimensional structure, therein creating the three-dimensional structure with pores sealed within an outer suface.

2. The method of claim 1, wherein forming the pores within the layer by applying pulsed energy includes:
    applying an energy pulse via an upper surface of the layer and using the energy pulse to form an open cavity in the layer and extending from the upper surface to a depth within the layer; and
    terminating the energy pulse and causing an upper portion of the cavity to collapse, therein forming a sealed space at the depth within the layer.

3. The method of claim 1, wherein forming the pores within the layer by applying pulsed energy includes scanning a laser via an upper surface of the layer, by:
    forming a first open cavity in the layer by applying a first laser pulse to a first portion of the upper surface, the first open cavity extending from the upper surface to a depth within the layer;
    collapsing an upper portion of the first open cavity and therein forming the sealed space at the depth within the layer, by terminating the first laser pulse; and
    after the laser is scanned past the first portion of the upper surface, forming a second open cavity in the layer by applying a second laser pulse via a second portion of the upper surface, the second open cavity extending from the upper surface to a depth within the layer, and collapsing an upper portion of the second open cavity and therein forming another sealed space at the depth within the layer, by terminating the first laser pulse.

4. The method of claim 1, wherein applying the pulsed energy includes applying energy pulses having a beam size, and controlling the size of each pore based on at least one characteristic selected from the group of: the size of the beam, laser frequency, and laser duty cycle.

5. The method of claim 1, wherein applying the pulsed energy includes controlling the size of each pore by controlling at least one characteristic selected from the group of: an amount of the pulsed energy applied, a frequency of the pulsed energy, and a duty cycle of the pulsed energy.

6. The method of claim 1, wherein forming the pores includes forming pores at a defined density by applying the pulsed energy to respective locations of the layer corresponding to the defined density.

7. The method of claim 1, wherein forming the pores includes forming the pores in a pattern and therein tuning the properties of the three-dimensional structure via the pores.

8. The method of claim 1, wherein forming the pores includes forming the pores in a pattern and therein reinforcing the three-dimensional structure with added function provided via the pores.

9. The method of claim 1, wherein applying the pulsed energy includes scanning a pulsed energy source across the layer, and wherein forming the pores includes controlling distance between the pores by setting a time between which respective pulses are applied.

10. The method of claim 1, wherein forming the pores includes adjusting the shape of the pores by adjusting temporal and spatial profiles of the pulsed energy.

11. The method of claim 1, wherein applying the pulsed energy includes applying pulsed laser energy.

12. The method of claim 1, wherein applying the pulsed energy includes applying pulsed electron beam energy.

13. The method of claim 1, wherein applying the pulsed energy includes:
    applying a first pulse to create a cavity; and
    applying a second pulse to create a melt pool that covers an upper portion of the cavity to form a pore.

14. The method of claim 1, wherein applying the pulsed energy includes:
    applying a first pulse to create a first cavity; and
    applying a second pulse to create a melt pool that covers an upper portion of the first cavity to form a first pore, and to form a second cavity for a second pore.

15. The method of claim 1, wherein forming the pores includes sealing the pores with the material from the layer that is melted via the pulsed energy and forming the pores without utilizing a metal foaming agent, therein mitigating entry of contamination into the pores.

16. The method of claim 1, wherein depositing the plurality of stacked layers includes:
    depositing a powder bed of material that is devoid of metal foaming agents over an underlying layer; and
    melting the powder bed of material via the applied pulsed energy while using the applied pulsed energy to form a pore in the underlying layer.

17. The method of claim 1, wherein depositing the plurality of stacked layers and forming the pores includes using the applied pulsed energy to simultaneously melt deposited material and form a pore underlying the deposited material being melted.

18. The method of claim 1, wherein depositing the plurality of stacked layers includes depositing a powder bed of material over an underlying layer and melting the powder bed of material by applying initial pulsed energy, prior to applying the pulsed energy to create pores in the underlying layer.

19. An apparatus comprising:
    a plurality of stacked layers devoid of metal foaming agents; and
    a plurality of pores in at least one of the stacked layers, each pore having an inner surface defined and fully sealed by material of a layer in which it is formed, each pore being spaced from adjacent ones of the pores by a defined gradient and being sealed within an outer surface of the apparatus.

20. The apparatus of claim 19, wherein each pore has an upper portion of the inner surface characterized by a re-melted portion of the material of the layer that seals a previously melted and solidified portion of the inner surface.

* * * * *